United States Patent Office 3,395,222
Patented July 30, 1968

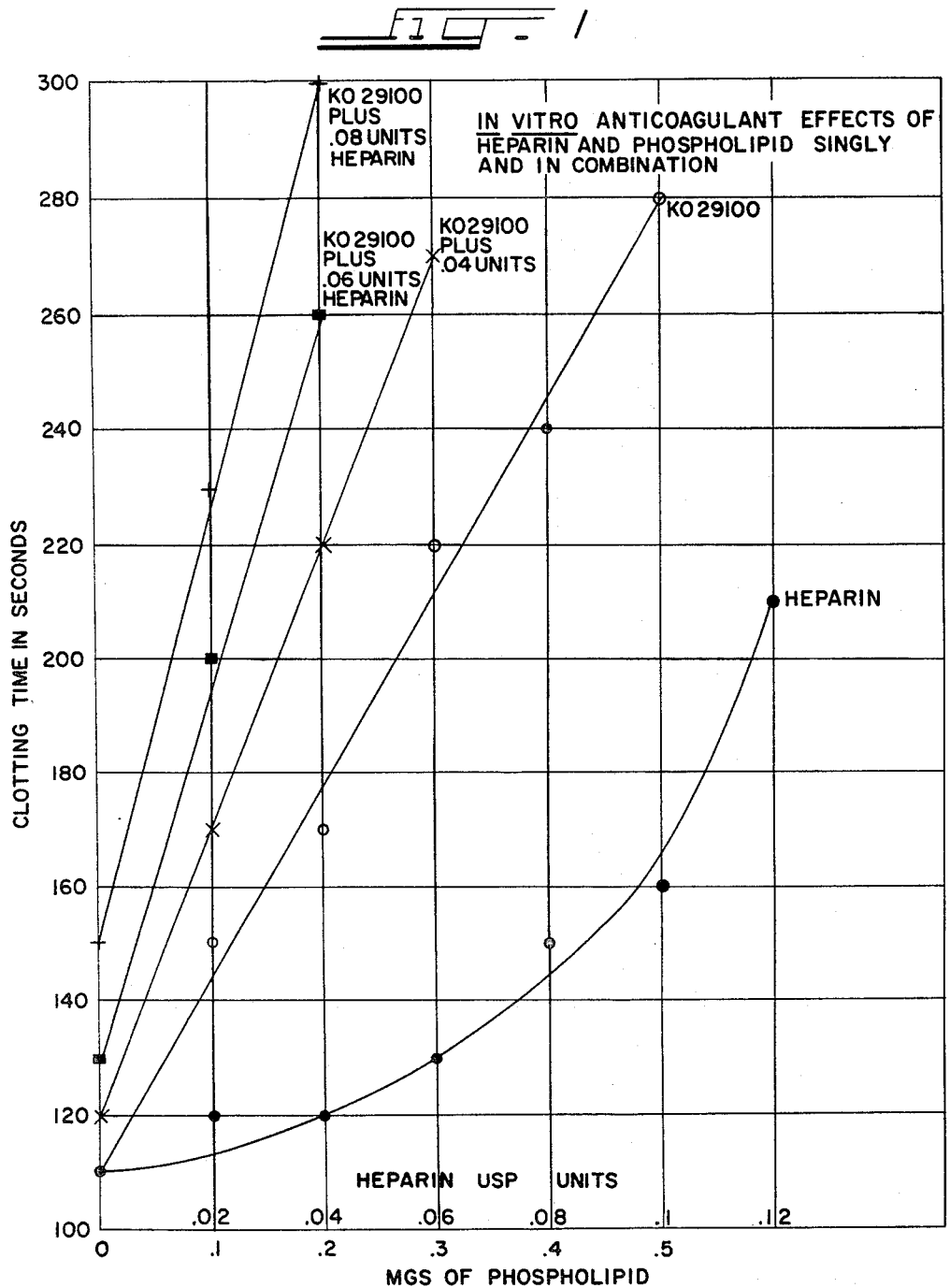

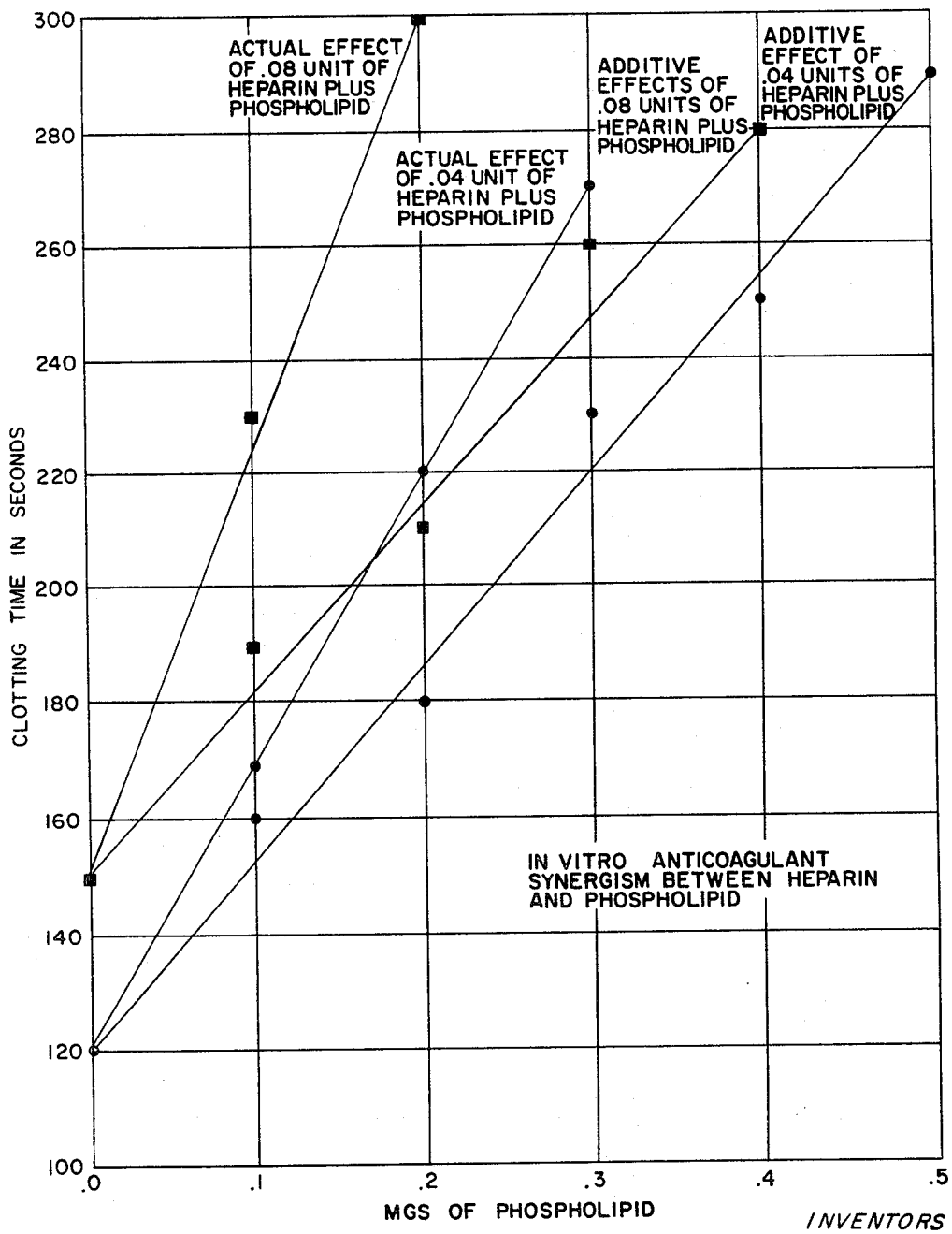

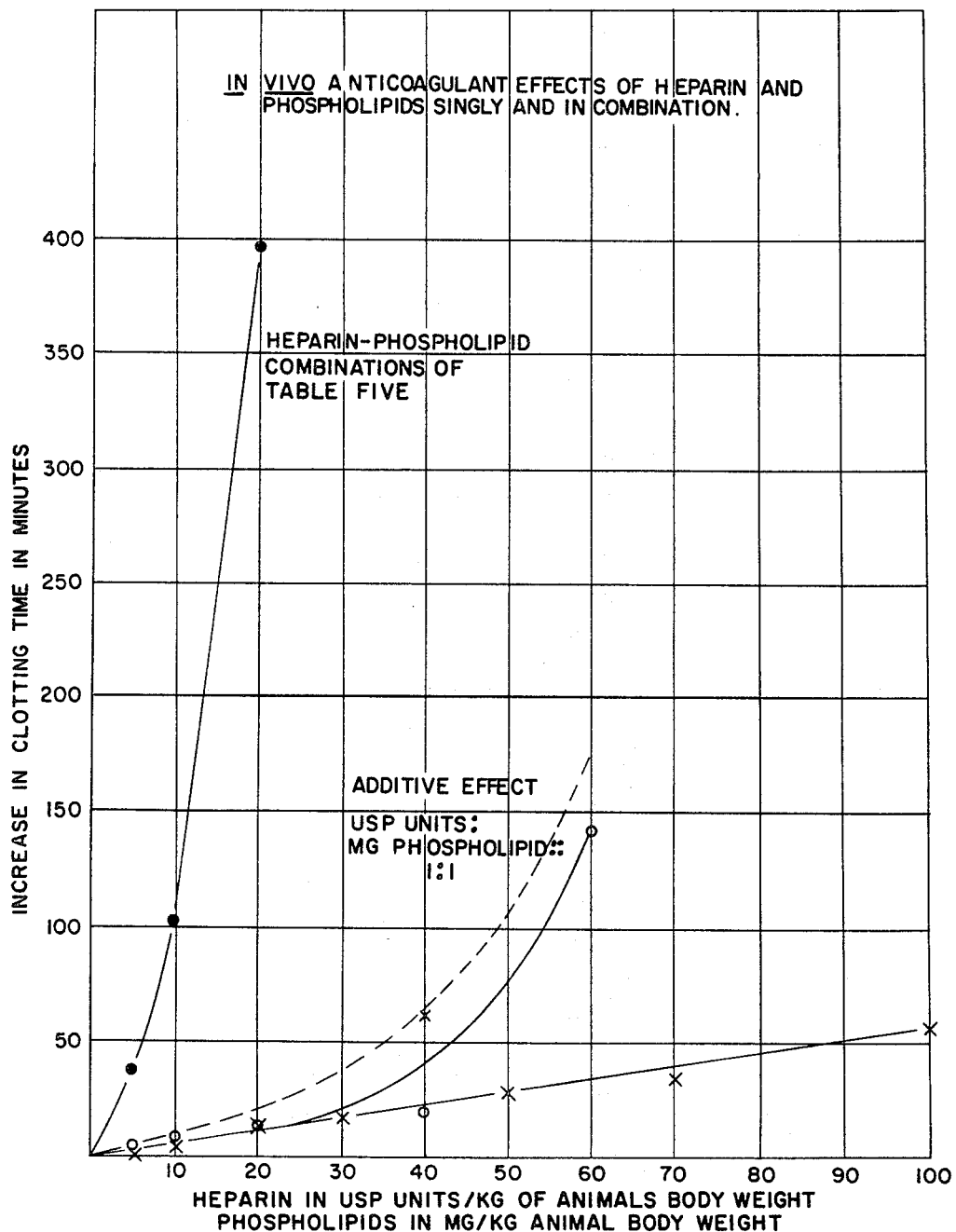

3,395,222
PROLONGATION OF CLOTTING TIME OF BLOOD
Robert L. Colescott, Bourbonnais, and Archie L. Caldwell, Jr., Kankakee, Ill., assignors to Armour Pharmaceutical Company, Chicago, Ill., a corporation of Delaware
Continuation-in-part of application Ser. No. 168,016, Jan. 19, 1962. This application Mar. 11, 1966, Ser. No. 533,735
8 Claims. (Cl. 424—183)

ABSTRACT OF THE DISCLOSURE

Preparations for prolonging the clotting time of blood comprising a synergistic combination of heparin and an anti-thromboplastic phospholipid; and a method of administering such preparations to human beings and other warm blooded animals.

---

This application is in part a continuation of our copending application Ser. No. 168,016, filed Jan. 19, 1962, now abandoned and describes an invention which relates to the prolongation of clotting time in mammals, and more particularly to the use of heparin and a phospholipid in combination for prolonging the blood clotting time in human beings and other warm blooded animals.

An object of the invention is to provide a preparation and method for prolonging the clotting time of blood. A further object is to provide for the use in combination of heparin and an anti-thromboplastic phospholipid which when administered to mammals, act synergistically with each other to increase the clotting time of the mammal's blood. These and still further objects as shall hereinafter appear are fulfilled by the present invention as will be readily discerned from a consideration of the following detailed description of embodiments exemplifying the salient features hereof, particularly in view of the accompanying drawings in which:

FIG. 1 is a graph showing in vitro anticoagulant effects of heparin (soluble, 1000 U.S.P. Units/cc.) and liver phospholipid K 029100 (prepared according to Dailey, U.S. Patent No. 3,089,820), singly and in combination, wherein the ordinant represents clotting time in seconds and the abscissa represents units of heparin (upper scale) and milligrams of phospholipid (lower scale);

FIG. 2 is a graph showing an in vitro comparison between additive effect of heparin-phospholipid (calculated from the values of FIG. 1) when .04 and .08 units of heparin are added to the amount of phospolipid indicated by the abscissa of the graph, and the actual effect of heparin plus phospholipid (observed) when .04 and .08 U.S.P. units of heparin are admixed with the amount of phospholipid indicated by the abscissa of the graph; the ordinant of the graph representing clotting time in seconds; and FIG. 3 is a graph showing the in vivo effect, measured as increase in the clotting time in minutes (ordinant), of admixed heparin and phospholipid, heparin being reported in U.S.P. units per kilogram of animal body weight and phospholipid being reported in milligrams per kilogram of animal body weight (abscissa), both singly and in combination (the weight ratio of heparin to phospholipid in the admixture being 1 to 100) as well as providing a comparison between the measured effect of the combination (top curve) and the calculated additive effect of heparin plus phospholipid (dotted line).

Phospholipids and their effect on blood coagulation are well known and may be classified as follows: (1) procoagulant (thromboplastic) phospholipids—phospholipids which accelerate the clotting rate of blood, i.e., shorten the clotting time; (2) neutral phospholipids—phospholipids which neither accelerate nor delay the clotting rate, i.e., have no effect on clotting time; and (3) anticoagulant (anti - thromboplastic) phospholipids — phospholipids which delay the clotting rate, i.e., prolong the clotting time.

For the practice of our invention, we prefer to employ anticoagulant (anti-thromboplastic) phospholipids for use in combination with heparin which is an anticoagulant substance. The combination of heparin and such phospholipids produces an effect upon the coagulation of blood both in vivo and in vitro greater than the sum of effects of the separate agents. The heparin and phospholipids may be premixed and the mixture administered parenterally or the heparin may be administered parenterally and the phospholipids administered orally. In addition, the mixture may be added to an in vitro system. The synergistic effect can also be produced by treating the patient with phospholipid and heparin simultaneously or successively and the agents may be introduced by the same or different routes provided both substances are present in the circulating blood simultaneously. It is found desirable to have sufficient heparin present to provide a heparin to phospholipid weight ratio of at least about 1:750 up to about 1:50.

As indicated, the synergistic effect produced by the simultaneous or successive administration of heparin and the anti-coagulant phospholipid is illustrated by the drawings. The in vitro demonstration of the synergistic effect is shown by FIGS. 1 and 2. It can be seen from FIG. 1 that the slope of the curve indicating the prolongation of coagulation time by the mixture is different from the slopes of the curves for either component alone.

In FIG. 2, it is also apparent the slope of the curve describing the effect of the synergistic mixture is different from the slope of the curve that would have been obtained if the effect of the two materials had been only additive.

To further aid in the understanding by the in vitro aspects of this invention, and not by way of limitation, reference is made to the following examples:

Example I

In vitro determinations were performed by conducting clotting time tests in 12 x 75 mm. culture tubes maintained at 37° C. in a water bath. Into each tube, we placed 0.2 ml. of Diagnostic Plasma (Warner-Chilcott), 0.1 ml. of Platelet Factor (Warner-Chilcott), prepared by diluting one vial to 5 ml. with 0.05 M imidazole buffer at pH 7.4; 0.1 ml. of imidazole buffer containing the material to be tested; and 0.1 ml. of 0.05 M calcium chloride solution. The calcium chloride was added last and a stop was started at the moment of calcium chloride addition. Clotting was detected by gently tilting the tube every ten seconds. The time elapsing from the addition of the calcium chloride until clotting occurred was recorded.

The results obtained conducting the foregoing on a control, i.e., blood with no added reparin or phospholipid, and on blood with additions of varied amounts of heparin and/or liver phospholipid (coded K 029100 and prepared according to the teaching of Dailey et al., U.S. 3,089,820, May 14, 1963) are reported in Table 1 below.

TABLE 1

| Amount of Heparin (U.S.P. units) | Amount of Phospholipid* (milligrams) | Clotting Time (seconds) | Increase in Clotting Time (seconds) |
|---|---|---|---|
| 0.00 [1] | 0 | 110 | 0 |
| 0.02 | 0 | 120 | 10 |
| 0.04 | 0 | 120 | 10 |
| 0.06 | 0 | 130 | 20 |
| 0.08 | 0 | 150 | 40 |
| 0.10 | 0 | 160 | 50 |
| 0.12 | 0 | 210 | 100 |
| 0 | [1] 0.0 | 110 | 0 |
| 0 | 0.1 | 150 | 40 |
| 0 | 0.2 | 170 | 60 |
| 0 | 0.3 | 220 | 110 |
| 0 | 0.4 | 240 | 130 |
| 0 | 0.5 | 280 | 170 |
| 0.04 | 0.1 | 170 | 60 |
| 0.04 | 0.2 | 220 | 110 |
| 0.04 | 0.3 | 270 | 160 |
| 0.06 | 0.1 | 200 | 90 |
| 0.06 | 0.2 | 260 | 150 |
| 0.08 | 0.1 | 230 | 120 |
| 0.08 | 0.2 | 300 | 190 |

*Liver phospholipid K 029100.
[1] (Control).

It may be observed from the data of Table 1 that the clotting time increases with heparin and phospholipid in combination are greater than would be predicted by simple addition of the results when each substance was tested alone.

Example II

Further in vitro determinations were conducted using the same general protocol described in Example I except that the culture tubes were kept in an air bath at 37° C. and that clotting time was detected by gently dipping a wire loop through the solution in the tube at approximate one second intervals. The results of these in vitro determinations are reported in Table 2, the phospholipid here used being a liver phospholipid code K 136037D which was prepared according to the procedure described in Adams and Colescott co-pending application Ser. No. 167,437, filed Jan. 19, 1963, now abandoned (Canadian Patent 742,715, issued Sept. 13, 1966).

TABLE 2

| Amount of Heparin (U.S.P. units) | Amount of Phospholipid* (milligrams) | Clotting Time (seconds) | Increase in Clotting Time (seconds) |
|---|---|---|---|
| 0.00 [1] | 0 | 115 | 0 |
| 0.04 | 0 | 110 | −5 |
| 0.06 | 0 | 130 | 15 |
| 0.08 | 0 | 145 | 30 |
| 0.10 | 0 | 189 | 74 |
| 0 | 0.05 | 129 | 14 |
| 0 | 0.1 | 147 | 32 |
| 0 | 0.2 | 160 | 45 |
| 0 | 0.3 | 191 | 76 |
| 0.06 | 0.05 | 155 | 40 |
| 0.06 | 0.1 | 192 | 77 |
| 0.06 | 0.2 | 245 | 130 |
| 0.08 | 0.05 | 202 | 87 |
| 0.08 | 0.1 | 240 | 235 |

*Liver phospholipid K 136037D.
[1] Control.

It may again be noted that the clotting time increases obtained with heparin and phospholipid in combination are greater than would be predicted by simple addition of the results obtained when each substance was tested alone.

The data reported above have been in part plotted and are shown in FIGS. 1 and 2 of the drawings.

To aid in a further understanding of the in vivo aspects of this invention, and not by way of limitation, reference shall now be made to the following examples.

Example III

In vivo experiments with rabbits, a laboratory animal having accepted correlation to human blood coagulation properties, were conducted as follows: Before treatment of the animals, clotting time determinations were carried out on arterial blood ("whole blood") by means of the thrombelastographic technique (P. De Nicola, "Thrombelastography," Chas. C. Thomas, Publisher, Springfield, Ill., 1967). All of the rabbits were maintained under anesthetic with pentobarbital sodium throughout the experiment. The anesthetic was administered intravenously by way of the marginal ear vein in a dosage of 25 mg. per kilogram of body weight. Blood samples were obtained by means of a polyethylene cannula surgically placed in the left cartoid artery. The blood was allowed to flow directly from the cannula into the sample cup of the thrombelastograph. Two blood samples were obtained from each rabbit, the first being taken prior to treatment and the second being taken fifteen (15) minutes after treatment with the material being tested.

The material to be tested (phospholipid, heparin, or combinations of heparin and phospholipid) were dissolved in isotonic solution and the concentration of the test material was varied in such manner that the dosage was always given in a total volume of one milliliter per kilogram body weight.

All test solutions were administered by way of the marginal ear vein.

The control clotting time determined by calculating the arithmetic means of the pretreatment clotting times was found to be 23.4 minutes (mean of eighty-four rabbits).

As would be expected, clotting time increased progressively with increasingly larger doses of heparin as shown in Table 3.

TABLE 3

| Dose of Heparin (U.S.P. units per kg.) | Number of Rabbits | Pretreatment Clotting Time (min.) | Posttreatment Clotting Time (min.) | Increase in Clotting Time (min.) |
|---|---|---|---|---|
| 5 | 6 | 22.4 | 25.7 | 3.3 |
| 10 | 6 | 24.4 | 32.8 | 8.4 |
| 20 | 6 | 16.5 | 30.0 | 13.5 |
| 40 | 6 | 22.9 | 42.1 | 19.2 |
| 60 | 6 | 25.0 | 166.2 | 141.2 |

Similarly, the clotting time increased with increasingly large doses of phospholipid as is shown by the data shown in Table 4.

TABLE 4

| Dose of Phospholipid (mg./kg.) | Number of Rabbits | Pretreatment Clotting Time (min.) | Posttreatment Clotting Time (min.) | Increase in Clotting Time (min.) |
|---|---|---|---|---|
| 5 | 3 | 23.9 | 25.4 | 1.5 |
| 10 | 6 | 22.4 | 25.4 | 3.1 |
| 20 | 6 | 24.4 | 38.8 | 14.4 |
| 30 | 6 | 23.8 | 41.5 | 17.7 |
| 40 | 6 | 25.4 | 87.2 | 61.8 |
| 50 | 6 | 23.4 | 49.8 | 26.4 |
| 70 | 6 | 24.2 | 57.6 | 33.4 |
| 100 | 6 | 24.1 | 79.6 | 55.5 |

It would be ordinarily expected that administration of a mixture of heparin and phospholipid would produce an increase in clotting time which could be predicted by simple addition of the clotting time increases produced by each substance alone. As an example, from the above results it would be predicted that administration of a mixture of heparin and phospholipid such that each animal received 20 U.S.P. units/kg. of heparin and 20 mg./kg. of phospholipid would result in an increase in clotting time of 27.9 minutes (14.4 minutes+13.5 minutes). In actual practice it was found that the clotting time increases resulting from the administration of mixtures of heparin and phospholipid were considerably greater than would be predicted. The actual results obtained are reported in Table 5 below.

TABLE 5

| Dose of Heparin (U.S.P. units per kg.) | Dose of Phospholipid (mg./kg.) | Number of Rabbits | Pretreatment Clotting Time (min.) | Posttreatment Clotting Time (min.) | Increase in Clotting Time (min.) |
|---|---|---|---|---|---|
| 5 | 20 | 3 | 24.9 | 67.4 | 42.5 |
| 10 | 20 | 3 | 22.8 | 125.1 | 102.3 |
| 20 | 20 | 3 | 26.1 | 422.3 | 396.2 |

The results of Table 5 clearly show that heparin and phospholipid act together synergistically.

The effects of the tested materials were determined by calculating the increase in clotting time of the posttreatment samples over the pretreatment samples, as indicated. These increases are plotted in FIG. 3. Examination of the drawing reveals graphically that the increases in clotting time caused by our combination of heparin and phospholipid is greater than could be expected on the basis of arithmetically additive effects and clearly demonstrate synergism between heparin and phospholipids in vivo. The phospholipid used in this determination was liver phospholipid K 029100, previously identified.

Still further understanding of the present invention can be garnered from a consideration of the following examples.

Example IV

A typical method of preparing a soybean phosphatide may be described as follows:

500 grams of soybean phosphatide concentrate (A. E. Staley & Co. STA–SOL UR) was extracted three times with 3,000 ml. portions of acetone. The residue was vacuum dried and then extracted twice with 3,000 ml. portions of anhydrous denatured ethyl alcohol. The residue was then dissolved in about 400 ml. of chloroform and precipitated by pouring into 2,000 ml. of acetone. The precipitate was collected on a Büchner funnel and dried under vacuum. The yield of this alcohol-insoluble soya phosphatide was 114 grams. 100 grams of this material were then placed in an open pan in an oven at 70° C. for two weeks to render the soybean phosphatide highly anti-thromboplastic.

The heparin was then pre-mixed with the anti-thromboplastic phosphatide and the preparation administered parenteral to rabbits as described above in connection with FIG. 3.

Example V

The soybean phosphatide, prepared according to Example IV, was used in performing the in vivo determination reported in Example III.

The data reflecting the use of heparin alone is shown in Table 6.

TABLE 6

| Dose of Heparin (U.S.P. units per kg.) | Dose of Phospholipid (mg./kg.) | Number of Rabbits | Pretreatment Clotting Time (min.) | Posttreatment Clotting Time (min.) | Increase in Clotting Time (min.) |
|---|---|---|---|---|---|
| 5 | 0 | 6 | 22.4 | 25.7 | 3.3 |
| 10 | 0 | 6 | 24.4 | 32.8 | 8.4 |
| 20 | 0 | 6 | 16.5 | 30.0 | 13.5 |
| 40 | 0 | 6 | 22.9 | 42.1 | 19.2 |
| 60 | 0 | 6 | 25.0 | 166.2 | 141.2 |

The results are consistent with our expectations and previous results.

The data reflecting the use of the soybean phosphatide of Example IV alone are reported in Table 7.

TABLE 7

| Dose of Heparin (U.S.P. units per kg.) | Dose of Phospholipid* (mg./kg.) | Number of Rabbits | Pretreatment Clotting Time (min.) | Posttreatment Clotting Time (min.) | Increase in Clotting Time (min.) |
|---|---|---|---|---|---|
| 0 | 20 | 6 | 23.0 | 34.5 | 11.5 |
| 0 | 40 | 6 | 19.8 | 35.5 | 15.8 |
| 0 | 60 | 6 | 18.9 | 70.9 | 52.0 |
| 0 | 80 | 5 | 21.3 | 84.4 | 63.1 |

*Soybean phospholipid K 075299.

These results are also consistent with our expectations and our previous results.

Finally the data showing the in vivo synergism of combinations of heparin and phospholipid are reported in Table 8.

TABLE 8

| Dose of Heparin (U.S.P. units per kg.) | Dose of Phospholipid* (mg./kg.) | Number of Rabbits | Pretreatment Clotting Time (min.) | Posttreatment Clotting Time (min.) | Increase in Clotting Time (min.) |
|---|---|---|---|---|---|
| 10 | 10 | 4 | 22.9 | 29.3 | 6.4 |
| 10 | 20 | 6 | 21.1 | 40.0 | 18.9 |
| 10 | 40 | 3 | 20.3 | 156.4 | 136.0 |
| 20 | 10 | 6 | 18.9 | 39.1 | 20.2 |
| 20 | 20 | 5 | 21.1 | 114.7 | 93.6 |

*Soybean phospholipid K 075299.

It should be understood from the foregoing that heparin and phospholipid may be employed in any desired proportions, since the proportions thereof are not critical. The addition to heparin of substantially any amount of the anti-thromboplastic phospholipid is effective in giving the results which have been described above.

While the heparin and phospholipid are in usual practice both administered parenterally, the synergistic effect will still be obtained regardless of route of administration provided both substances are present in the circulating blood simultaneously. Thus, phospholipid can be administered orally as well. Of course, heparin administration would usually be by parenteral administration.

It should be understood that in correlating the weight of phospholipid to the weight of heparin, when heparin is presented as U.S.P. units, notice should be made of the relationship that heparin contains approximately 100 U.S.P. units per milligram. Thus, weight ratios of, for instance, 0.04 U.S.P. units of heparin to 0.3 milligram of phospholipid may be readily calculated using but ordinary mathematical skills.

The term "anti-coagulant phospholipid" as herein used is known to the art. The two principal sources of anti-coagulant phospholipid are animals and plants which may be characteristically illustrated by mammalian tissue, e.g., liver and soyabean. See: "Activation of Purified Prothrombin to Autoprothrombin I or Autoprothrombin II (Platelet Cofactor II) or Autoprothrombin II–A," Mammen, E.F., Thomas, W. R., and Seegers, W. H., *Thromb. Diath. haem.* vol. 5, p. 280 (1960) and particularly Fig. 1 and p. 218.

It should also be understood that we have herein defined our synergistic combinations in terms of minimal proportions which are capable of extending clotting time well beyond normal desires. To further extend these proportions would render the blood virtually uncoagulable and would serve no useful purpose.

From the foregoing description and examples it can be seen that new and unexpected benefits have been obtained by our discovery of synergistic combinations of heparin and phospholipids for prolonging the clotting time of blood which, in addition, to fulfilling all of the aforestated objectives in a remarkably unexpected manner, is intended to include such modifications and applications and alterations as may readily occur to the artisan confronted with this disclosure as within the spirit hereof, especially as it is defined by the scope of the claims appended hereto.

What is claimed is:

1. A method for prolonging the clotting time of blood comprising administering systemically to human beings and other warm blooded animals heparin and anti-coagulant phospholipid in a weight ratio of at least about 1 part heparin to 750 parts phospholipid up to about one part heparin to about 50 parts phospholipid for concurrent engagement with said blood, said heparin being administered parenterally.

2. The method according to claim 1 in which said heparin and said anti-coagulant phospholipid are administered simultaneously.

3. The method according to claim 2 in which said heparin and said phospholipid are administered parenterally.

4. The method according to claim 1 in which said heparin and said anti-coagulant are admixed prior to said administration to form an admixture having a heparin to phospholipid weight ratio of about 1:100.

5. The method according to claim 3 in which said parenteral administration is intravenously.

6. A preparation for the in vivo prolongation of blood clotting time comprising in synergistic combination heparin and an anti-coagulant phospholipid, said heparin being present in sufficient quantity to provide a heparin to phospholipid weight ratio of at least about 1:750 up to about 1:50.

7. A preparation according to claim 6 in which said weight ratio is about 1:100.

8. A preparation according to claim 6 containing at least about 0.01 U.S.P. units of heparin per milligram of phospholipid.

References Cited

UNITED STATES PATENTS 3,089,820   6/1963   Dailey _____ 167—74.6

OTHER REFERENCES

Chem. Abs. ACS, vol. 47, 1953, p. 8117e, vol. 48, 1954, p. 3571e, vol. 49, 1955, p. 8443b (copy in POSL).

Silver, Amer. J. Physio., vol. 190, 1957, pp. 8–12 (copy in Group 120) 167–65.5 A.

Physician's Desk Reference, Medical Economics, Oradell, N.J. (copyright 1959), p. 859 (copy in Group 120).

ALBERT T. MEYERS, *Primary Examiner.*

A. FAGELSON, *Assistant Examiner.*